United States Patent
Peng

(10) Patent No.: US 8,562,939 B2
(45) Date of Patent: Oct. 22, 2013

(54) SEMICONDUCTOR NANOCRYSTAL SYNTHESIS USING A CATALYST ASSISTED TWO-PHASE REACTION

(75) Inventor: Adam Peng, Schenectady, NY (US)

(73) Assignee: Evident Technologies, Troy, NY (US)

( * ) Notice: Subject to any disclaimer, the term of this patent is extended or adjusted under 35 U.S.C. 154(b) by 585 days.

(21) Appl. No.: 12/713,786

(22) Filed: Feb. 26, 2010

(65) Prior Publication Data

US 2010/0226849 A1    Sep. 9, 2010

Related U.S. Application Data

(60) Provisional application No. 61/158,338, filed on Mar. 6, 2009.

(51) Int. Cl.
| | | |
|---|---|---|
| *C01B 19/00* | (2006.01) | |
| *C01B 19/04* | (2006.01) | |
| *H01L 29/08* | (2006.01) | |
| *H01L 21/00* | (2006.01) | |
| *H01L 21/06* | (2006.01) | |

(52) U.S. Cl.
USPC .............. 423/508; 423/509; 257/40; 438/84; 438/95; 438/102

(58) Field of Classification Search
None
See application file for complete search history.

(56) References Cited

U.S. PATENT DOCUMENTS

| | | | | |
|---|---|---|---|---|
| 2006/0211152 | A1* | 9/2006 | Peng et al. | 438/3 |
| 2008/0044340 | A1* | 2/2008 | Wu et al. | 423/509 |
| 2010/0052512 | A1* | 3/2010 | Clough et al. | 313/498 |

OTHER PUBLICATIONS

Reiss, Peter "ZnSe based colloidal nanocrystals: synthesis, shape control, core/shell, alloy and doped systems". New J. Chem, 31, 1843-1852 (2007).*
Wang, Xun, et al. "Synthesis and Characerization of Sulfide and Selenide Colloidal SEmiconductor Nanocrystals" Langmuir, 22, 7364-7368 (2006).*

* cited by examiner

*Primary Examiner* — Patricia L Hailey
*Assistant Examiner* — Sheng H Davis
(74) *Attorney, Agent, or Firm* — Hoffman Warnick LLC

(57) ABSTRACT

A method for producing a high yield of high quality, low size distribution, and size tunable semiconductor nanocrystals. The method produces III-V, II-VI, II-V, IV-VI, IV, ternary, quarternary, and quinary semiconductor nanocrystals (quantum dots) using a catalyst assisted two-phase reaction.

13 Claims, 2 Drawing Sheets

SEMICONDUCTOR NANOCRYSTAL SYNTHESIS USING A CATALYST ASSISTED TWO-PHASE REACTION

FIELD OF INVENTION

The present invention relates to semiconductor nanocrystal synthesis, and more particularly to the synthesis of III-V, II-VI, II-V, IV-VI, and IV material, ternary, quarternary, and quinary semiconductor nanocrystal materials.

BACKGROUND OF THE INVENTION

It is desirable to produce semiconductor nanocrystals of suitable size with a uniform size distribution for a range of applications, including applications where a high luminescent quantum yield is required. Semiconductor nanocrystals are typically tiny crystals of II-VI, III-V, IV-VI, II-V, and IV materials that have a diameter between 1 nanometer (nm) and 20 nm. In the strong confinement limit, the physical diameter of the nanocrystal is smaller than the bulk excitation Bohr radius causing quantum confinement effects to predominate. In this regime, the semiconductor nanocrystal is a 0-dimensional system that has both quantized density and energy of electronic states where the actual energy and energy differences between electronic states are a function of both the semiconductor nanocrystal composition and its physical size. Larger nanocrystals have more closely spaced energy states and smaller nanocrystals have the reverse. Because interaction of light and matter is determined by the density and energy of electronic states, many of the optical and electric properties of nanocrystals can be tuned or altered simply by changing the nanocrystal geometry (i.e. physical size) or its material composition.

Single semiconductor nanocrystals or monodisperse populations of nanocrystals exhibit unique optical properties that are size tunable. Both the onset of absorption and the photoluminescent wavelength are a function of nanocrystal size and composition. The nanocrystals will absorb all wavelengths shorter than the absorption onset. However, photoluminescence will always occur at the absorption onset. The bandwidth of the photoluminescent spectra is due to both homogeneous and inhomogeneous broadening mechanisms. Homogeneous mechanisms include temperature dependent Doppler broadening and broadening due to the Heisenberg uncertainty principle, while inhomogeneous broadening is due to the size distribution of the nanocrystals. The narrower the size distribution of the nanocrystals, the narrower the full-width half max (FWHM) of the resultant photoluminescent spectra. In 1991, Brus wrote a paper reviewing the theoretical and experimental research conducted on colloidally grown semiconductor nanocrystals, such as cadmium selenide (CdSe) in particular. (Brus L., Quantum Crystallites and Nonlinear Optics, Applied Physics A, 53 (1991)). That research, precipitated in the early 1980's by the likes of Efros, Ekimov, and Brus himself, greatly accelerated by the end of the 1980's as demonstrated by the increase in the number of papers concerning colloidally grown semiconductor nanocrystals.

Quantum yield (i.e. the percent of absorbed photons that are reemitted as photons) is influenced largely by the surface quality of the nanocrystal. Photoexcited charge carriers will emit light upon direct recombination but will give up the excitation energy as heat if photon or defect mediated recombination paths are prevalent. Because the nanocrystal may have a large surface area to volume ratio, dislocations present on the surface or adsorbed surface molecules having a significant potential difference from the nanocrystal itself will tend to trap excited state carriers and prevent radiactive recombination and thus reduce the quantum yield of the nanocrystal.

SUMMARY OF THE INVENTION

In an embodiment, the present invention provides for a method of synthesizing semiconductor nanocrystals comprising: incompletely reacting a metal chalcogenide with an organic acid to form a metal-acid complex precursor and water; adding to the metal-acid complex precursor a solution containing Se:TBP (selenium dissolved in tributylphosphine), Se:TOPO (selenium dissolved in trioctylphosphine oxide), or both, to form nanocrystal seeds and an acidic ion; and growing a plurality of semiconductor nanocrystals from the nanocrystal seeds, wherein the acidic ion combines with a catalyst to reform the organic acid.

BRIEF DESCRIPTION OF DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
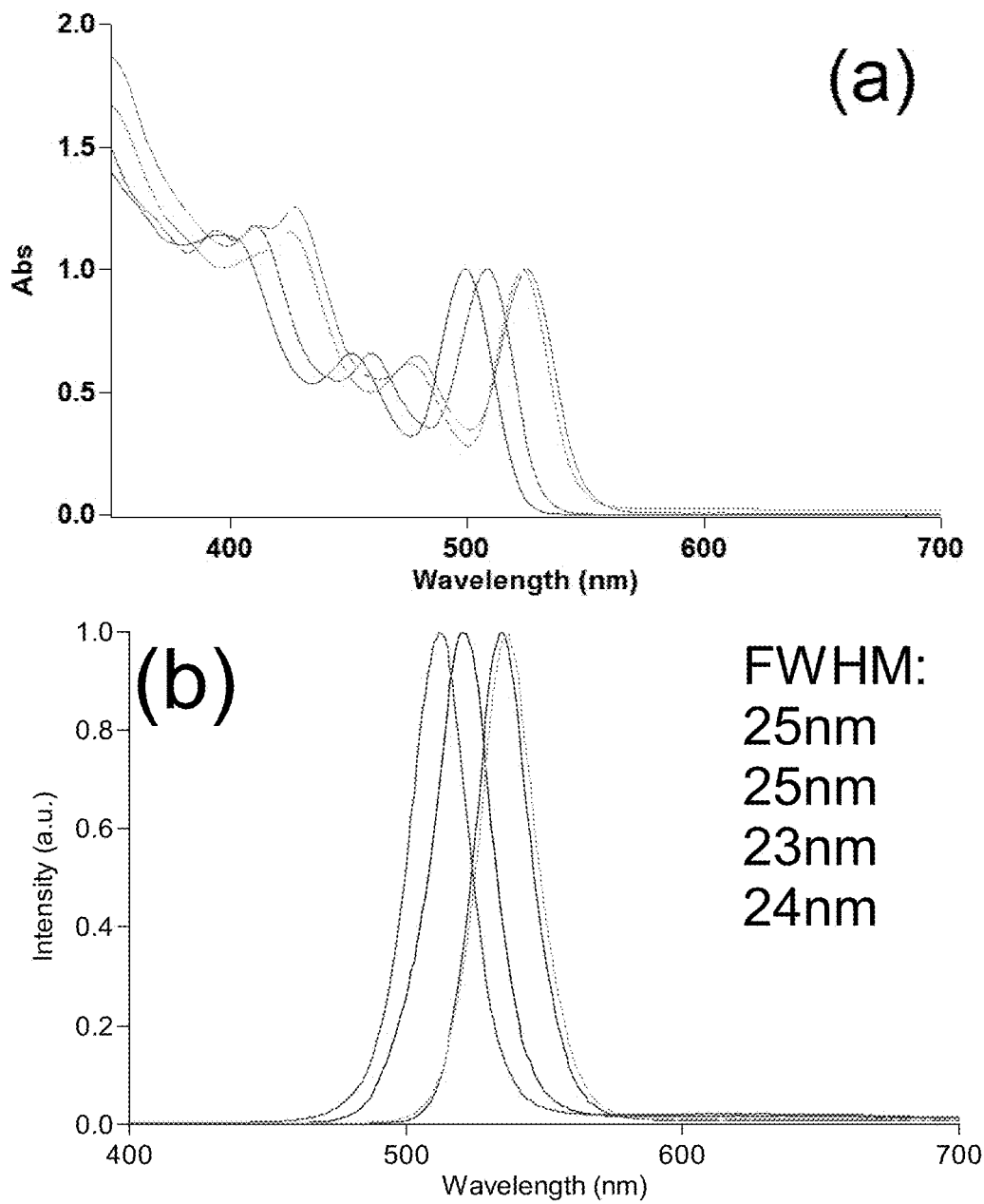
FIG. 1 shows the related absorption (a) and emission (b) spectra for solutions of varying reaction times.

The present invention provides a method for synthesizing a substantially monodisperse population of semiconductor nanocrystals, each semiconductor nanocrystal comprising either a III-V, II-VI, II-V, IV-VI, IV, or some combination thereof, ternary, quarternary, or quinary semiconductor material, wherein the substantially monodisperse population of semiconductor nanocrystals is stable, size tunable, and of high quality with a high luminescent quantum yield and few surface defects.

The example provided below discloses a novel method for producing high quality, low size distribution nanocrystals according to one embodiment of the invention. Although the example describes the synthesis of CdSe nanocrystals, it will be appreciated that other types of semiconductor nanocrystals may be synthesized using similar methods according to other embodiments of the invention.

In one embodiment, a solid quantity of a metal chalcogenide, such as CdO, is reacted with an organic acid, which may be oleic acid. However, one skilled in the art will understand that a range of organic acids may be utilized, which may also consist of TDPA (Thiodipropionic Acid), HPA (Hydroxypropyl Acrylate), stearic acid, and mixtures thereof, though not limited to these examples. This organic acid may not be concentrated enough to completely dissolve the CdO. Incomplete dissolution of the CdO allows for the solution to remain non-transparent. The solution will now contain an amount of Cd—OOC—R (where R represents $CH_3(CH_2)_7CH=CH(CH_2)_7$) complex precursor and $H_2O$. In this embodiment, Se-TBP(aq) is then added to the solution. This will form Cd—Se(s) seeds with R—COO$^-$ and TBP left in solution. The R—COO$^-$ ion will react with $H_2O$ to recreate and replenish the R—COOH species. In this embodiment, the $H_2O$ can act as a catalyst. In such an embodiment, with $H_2O$ as a catalyst, there are always two phases of material, solid and liquid, present at all times throughout the invented method.

This method results in the formation of CdSe nanocrystals that are of a high quality with a narrow size distribution band. The full width at half maximum of CdSe nanocrystals produced may be around 22-24 nm, which indicates a narrow size distribution. This result is achieved primarily because of the fact that the concentration of the precursor, $Cd^{2+}$, is kept constant throughout the reaction which contrasts with prior methods of synthesizing nanocrystals, where the precursor concentration diminishes as the reaction proceeds. Prior methods of synthesizing nanocrystals having diminishing precursor concentrations typically result in a more broad size distribution, as indicated by a broader full width at half max. Furthermore, since the precursor concentration remains constant, the invented reaction may produce a high yield of semiconductor nanocrystal product. This method can be used to make high quality semiconductor nanocrystals of ZnSe, InP and other III-V, II-VI, II-V, IV-VI, IV, ternary, quaternary, and quinary semiconductor nanocrystals.

EXAMPLE

Preparing a batch of high quality (3 nm) II-VI Semiconductor Nanocrystals

The present example discloses how to prepare stable, high quality (3 nm) cadmium selenide (CdSe) semiconductor nanocrystals.

First, 61.632 grams of solid cadmium oxide (CdO(s)), 189.82 grams of oleic acid (technical grade), and 210 grams of octadecene (ODE) are loaded into a 1-liter reaction flask. The system is purged with a nitrogen flow for 10 minutes.

While the reaction flask is purging, two separate stock solutions are made in a nitrogen flowing glove box. Stock Solution 1 contains 15.8 grams of 20% Se:TBP (selenium dissolved in tributylphosphine) solution and 84.2 grams of ODE. Stock Solution 2 contains 4.74 grams of 20% Se:TBP solution and 45.4 grams of ODE. The stock solutions are transported out of the glove box while sealed from the air and loaded separately into syringe 1 and 2, respectively, under nitrogen. It is important that the solutions are not exposed to oxygen in the air. Although Se:TBP is used in the example, it should be understood that Se:TOPO (selenium dissolved in trioctylphosphine oxide) and other similar compounds may be used.

Next, the above reaction flask is heated to 295° C. using a heating mantle while maintaining the flow of nitrogen. Syringe 1 containing stock solution 1 is quickly injected into the reaction flask. The flask is subsequently kept at 250° C. while nanocrystals are growing. Syringe 2 containing stock solution 2 is then slowly injected into the reaction flask at time 5:00 minutes after the first injection to facilitate further growth. The reaction is stopped at time 30:00 minutes after the first injection by injection of 120 mL of ODE, which serves to cool down the temperature, and then by removing the flask from the heat mantle. It will be appreciated that 30 minutes of reaction time will grow nanocrystals of size ~3 nm with low size distribution (full width at half maximum of ~22 nm). It will also be appreciated that aliquots of solution can be extracted at various times from the reacting solution to produce high quality nanocrystals of various sizes and further prepared according to the process below. Reaction temperatures, though at 295° C. and 250° C. in the above example, may vary between 200° C. and 350° C.

Once the temperature of the reaction flask has dropped to 70° C., 130 mL of $HCCl_3$ (chloroform) is added. This solution is now poured into a 1 liter centrifuge bottle, and centrifuged at 4000 rpm for 10 minutes to separate the nanocrystals (quantum dots) and any unreacted CdO. The supernatant is poured into a 4 liter beaker, and then purified twice. To purify, 80 mL of $HCCl_3$ is added while stirring. 300 mL of methanol is then added while stirring. The solution is then poured into a 2 liter separation funnel for separation. The clear solution from the bottom of the separation funnel is released. The oil layer is then released into the beaker, using 2 washes of 100 mL $HCCl_3$ each to wash the separation funnel into the beaker. The solution is stirred for a few minutes. 300 mL of methanol is added to the solution, and stirred for a few minutes. The solution is transferred into a 2 liter separation funnel for separation. The solution is allowed to sit for 15 minutes. Repeat this separation process again, using 400 mL of methanol for a high quality separation.

After purification, the solution is poured into 300 mL of warm (~70-80° C.) butanol (analytical grade). 150 mL of methanol (analytical grade) at room temperature is added to precipitate the nanocrystals out of the solution. The solution is then poured into two 1 liter centrifuge bottles, and centrifuged for 10 minutes at 5000 rpm. Clear supernatant is poured out and the solid is dissolved into $HCCl_3$ or toluene.

FIG. 1 shows the related absorption (a) and emission (b) spectra for solutions of varying reaction times.

Figure 2:
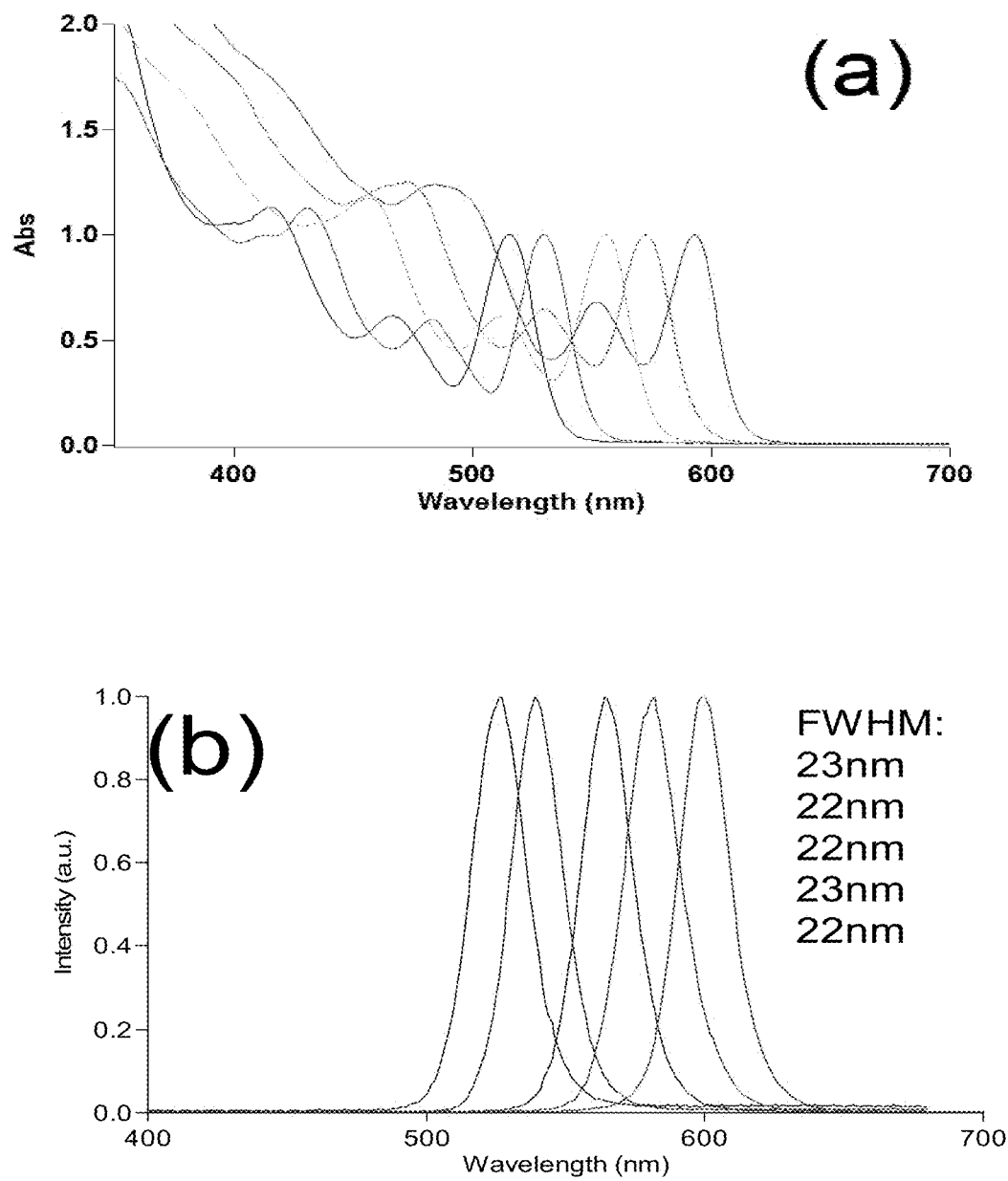
FIG. 2 shows the absorption (a) and emission (b) spectra from one of the adjusted reactions.

The above reaction can be adjusted (e.g., by modifying the ratio of Se:TBP in the stock solutions and extracting an aliquot of reacting solution at various times to produce a full range of nanocrystal sizes (i.e. particle size ranging from 2-10 nm, or only 3 nm and 7 nm sized nanocrystals)). FIG. 2 shows the absorption (a) and emission (b) spectra from one of the adjusted reactions. The full width half maximum (FWHM) of each aliquot demonstrates the quality of nanocrystals produced by this method.

The foregoing description and example have been set forth merely to illustrate the invention and are not intended as being limiting. Each of the disclosed aspects and embodiments of the present invention may be considered individually or in combination with other aspects, embodiments, and variations of the invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Furthermore, all references cited herein are incorporated by reference in their entirety.

What is claimed is:

1. A method of synthesizing semiconductor nanocrystals comprising:

reacting a metal chalcogenide with an organic acid to form a metal-acid complex precursor and water; wherein the metal chalcogenide is not completely dissolved in the organic acid, adding to the metal-acid complex precursor and water a solution containing Se:TBP (selenium dissolved in tributylphosphine), Se:TOPO (selenium dissolved in trioctylphosphine oxide), or both, to form nanocrystal seeds and an acidic ion; and growing a plurality of semiconductor nanocrystals from the nanocrystal seeds, wherein the acidic ion combines with a catalyst to reform the organic acid.

2. The method of claim 1, wherein the catalyst includes water.

3. The method of claim 1, wherein the organic acid includes at least one acid selected from a group consisting of: oleic acid, TDPA (Thiodipropionic Acid), HPA (Hydroxypropyl Acrylate), and stearic acid.

4. The method of claim 1, further comprising:
removing a sample of the semiconductor nanocrystals; and
determining a size of at least one semiconductor nanocrystal in the sample of semiconductor nanocrystals.

5. The method of claim 4, further comprising:
purifying the sample of the semiconductor nanocrystals.

6. The method of claim 4, further comprising:
removing an additional sample of the semiconductor nanocrystals; and
determining a size of at least one additional semiconductor nanocrystal in the additional sample of semiconductor nanocrystals.

7. The method of claim 5, wherein the size of the at least one additional semiconductor nanocrystal is greater than the size of the at least one semiconductor nanocrystal.

8. The method of claim 6, further comprising:
purifying the additional sample of the semiconductor nanocrystals.

9. The method of claim 1, wherein a concentration of the metal-acid complex precursor remains substantially constant during the growing the plurality of semiconductor nanocrystals.

10. The method of claim 1, wherein the plurality of semiconductor nanocrystals is selected from a group consisting of: III-V semiconductor nanocrystals, II-VI semiconductor nanocrystals, II-V semiconductor nanocrystals, IV-VI semiconductor nanocrystals, and IV semiconductor nanocrystals.

11. The method of claim 10, wherein the plurality of semiconductor nanocrystals is selected from a group consisting of: ternary semiconductor nanocrystals, quarternary semiconductor nanocrystals, and quinary semiconductor nanocrystals.

12. The method of claim 1, wherein the plurality of semiconductor nanocrystals have a low size distribution.

13. The method of claim 12, further comprising:
purifying the plurality of semiconductor nanocrystals.

* * * * *